US012387857B2

(12) United States Patent
Viviroli

(10) Patent No.: US 12,387,857 B2
(45) Date of Patent: Aug. 12, 2025

(54) CABLE PROCESSING MACHINE WITH SEPARATE CABLE STORAGE MEANS

(71) Applicant: Komax Holding AG, Dierikon (CH)

(72) Inventor: Stefan Viviroli, Horw (CH)

(73) Assignee: KOMAX HOLDING AG, Dierikon (CH)

(*) Notice: Subject to any disclaimer, the term of this patent is extended or adjusted under 35 U.S.C. 154(b) by 958 days.

(21) Appl. No.: 17/248,480

(22) Filed: Jan. 27, 2021

(65) Prior Publication Data

US 2021/0249159 A1 Aug. 12, 2021

(30) Foreign Application Priority Data

Feb. 10, 2020 (EP) .................................... 20156382

(51) Int. Cl.
*H01B 13/00* (2006.01)
*H01R 43/052* (2006.01)

(52) U.S. Cl.
CPC ..... *H01B 13/0003* (2013.01); *H01B 13/0036* (2013.01); *H01R 43/052* (2013.01)

(58) Field of Classification Search
CPC ............ H01B 13/0003; H01B 13/0036; Y10S 198/95; B65G 47/52; B65G 47/57; B65G 13/10
See application file for complete search history.

(56) References Cited

U.S. PATENT DOCUMENTS

| | | | | |
|---|---|---|---|---|
| 4,520,966 | A | 6/1985 | Bloch et al. | |
| 4,641,427 | A | 2/1987 | Shields | |
| 2020/0035384 | A1* | 1/2020 | Kiser | H01R 43/052 |
| 2020/0090723 | A1 | 3/2020 | Katayama | |

FOREIGN PATENT DOCUMENTS

| | | | |
|---|---|---|---|
| EP | 0413655 | A2 | 2/1991 |
| EP | 3219654 | A1 | 9/2017 |
| JP | H0441127 | A | 2/1992 |
| JP | H05301123 | A | 11/1993 |
| JP | 2011210460 | A | 10/2011 |
| JP | 2013182672 | A | 9/2013 |
| JP | 2014176248 | A | 9/2014 |
| JP | 2016144850 | A | 8/2016 |
| WO | 2017119175 | A1 | 7/2017 |

* cited by examiner

*Primary Examiner* — Saul Rodriguez
*Assistant Examiner* — Willie W Berry, Jr.
(74) *Attorney, Agent, or Firm* — William J. Clemens; Shumaker,Loop &Kendrick, LLP

(57) ABSTRACT

A cable processing machine has a processing region for processing cables, an operating region for operation of the machine by an operator, a conveying device that conveys batches of cables processed in the processing region from the processing region to the operating region, a cable storage device having a receiving portion accessible from the processing region for receiving individual cables processed in the processing region and a removal portion accessible from the operating region for safe removal of the individual cables by the operator, as well as a feed device that feeds the cables processed in the processing region either to the conveying device or to the receiving portion.

17 Claims, 11 Drawing Sheets

CABLE PROCESSING MACHINE WITH SEPARATE CABLE STORAGE MEANS

FIELD

The present invention relates to a cable processing machine for processing cables and to a method for operating such a cable processing machine.

BACKGROUND

Cable processing machines can produce batches of cables, i.e. a certain number of cables of the same cable type, fully automatically. The finished cables are usually removed by hand by an operator, for example from a removal tray which is specially provided for removal and into which the cables are automatically thrown and transported to the operator as soon as a batch has been completed.

Before cable production can be started on such a cable processing machine, one or more training cables or cable samples are usually produced first for quality purposes and for parameterizing a processing process, and these cables are checked by the operator. Transporting the finished cable samples to the operator by means of the removal tray can take a few seconds at a time. If a plurality of cable samples are to be produced one after the other, the time required to prepare the cable processing machine can increase significantly simply on account of the transport of the cable samples to the operator.

Usually, all cables produced by the cable processing machine, regardless of whether they are cables from a batch, a random sample or individual training cables, are placed in the same removal tray. This is automatically moved, for example, to a safe operating region of the cable processing machine at certain times, for example every time a batch has been completed, and the operator can then remove the cables. It may therefore be the case that different types of cables mix with one another in the removal tray. The cables must then be sorted by hand by the operator. This is time-consuming, partly because the operator has to wait until a batch has been completed to access the cables, and partly because it is prone to errors.

SUMMARY

It is thus an object of the invention to improve the removal of cables from a cable processing machine.

This object is achieved by a cable processing machine and a method according to the following description.

A first aspect of the invention relates to a cable processing machine for processing cables. The cable processing machine comprises a processing region for processing the cables, an operating region for operation of the cable processing machine by an operator, a conveying device which is designed to convey batches of cables processed by the cable processing machine from the processing region to the operating region, a cable storage means comprising a receiving portion accessible from the processing region for receiving individual cables processed by the cable processing machine and a removal portion accessible from the operating region for safe removal of the individual cables by the operator, as well as a feed device which is designed to feed the cables processed by the cable processing machine either to the conveying device or to the receiving portion.

With the option of storing individual cables such as short training or sample cables or other short cables, e.g. cable waste or faulty cables, in a separate cable storage means, quality controls can be carried out in less time and with less susceptibility to errors than if the cables are discharged from the cable processing machine only in production batches.

In particular, during a production operation of the cable processing machine, for example a machine for attaching contacts to cable ends by means of crimping, the individual cables can be removed separately from the cables of a production batch for inspection. In addition to saving time, this has the advantage that random samples can be checked immediately without prior manual sorting. This means that it is possible to intervene early if the random sample is poor. This also avoids training or sample cables mixing with a random sample and thus limiting the informative value of the random sample.

The processing region can comprise a region of the cable processing machine that is potentially hazardous to the operator and that should not be accessible to the operator at least during operation of the cable processing machine. Tools that are required for processing the cables and means for transporting the cables, such as conveyor belts or cable grippers, can be arranged in the processing region. By contrast, an operating region can be understood to mean a region of the cable processing machine in or from which the operator can safely operate the cable processing machine. A human-machine interface for controlling the cable processing machine, for example in the form of a screen and an input device such as a keyboard or a mouse, can also be arranged in the operating region.

The conveying device can, for example, comprise a conveyor belt, a movable or tiltable tray or a gripping system for moving the cables, or a combination of at least two of the examples mentioned. For example, the conveying device can comprise two batch trays connected in series, which allow for uninterrupted production of a plurality of batches one after the other.

A cable storage means can be understood to mean a container or a storage area for storing cables, for example. It is possible for the cable storage means to be movably arranged in the cable processing machine. Alternatively, the cable storage means can be fixed in the cable processing machine. The receiving portion can open into the removal portion so that cables that are placed in the receiving portion can get into the removal portion, for example by the effect of gravity, and can be removed in the operating region separately from the respective cables of a production batch. For example, the receiving portion can comprise a chute or a duct for guiding the cables into the removal portion. The removal portion can comprise a collecting container, a tray or a channel for removing the cables, for example.

The removal portion can be designed, for example, in such a way that the operator cannot reach into the potentially hazardous region of the cable processing machine or cannot reach into the processing region at all with his hand or individual fingers when removing the cables. For this purpose, the removal portion can be appropriately narrowed or closed by a suitable mechanism toward the processing region, for example, when the operator removes the cables.

It is possible for the removal portion to extend at least partially within the processing region, provided that it is ensured that the operator can safely remove the cables from the removal portion.

Additionally or alternatively, the cable processing machine can comprise a protective wall or protective cover which separates the processing region and the operating region around the cable storage means in such a way that inadvertent reaching into the processing region is prevented or at least made more difficult.

The feed device can comprise a combination of two feed devices that are movable independently of one another, for example, one for moving cables to the conveying device and another for moving cables to the cable storage means. This may be a combination of two cable grippers or of a conveyor belt and a cable gripper. Alternatively, the feed device can be formed by a pivotable cable gripper or a pivotable conveyor belt. The cable gripper or the conveyor belt can be pivoted back and forth between the conveying device and the cable storage means. However, any other desired embodiments of the feed device are also possible. It is conceivable, for example, for the feed device to comprise one or more movable or tiltable trays for receiving the cables, similarly to the conveying device.

A second aspect of the invention relates to a method for operating a cable processing machine as described above and below. The method comprises the following steps: processing a cable in the processing region and moving the cable processed in the processing region by means of the feed device either to the conveying device in order to form a batch of cables and convey it from the processing region to the operating region, or to the receiving portion of the cable storage means in order to provide the cable separately from the batch in the operating region.

Features of the cable processing machine, as it is described above and below, can also be features of the method and vice versa.

Possible features and advantages of embodiments of the invention may be considered, inter alia and without limiting the invention, to be dependent upon the concepts and findings described below.

According to one embodiment, the cable storage means is designed to prevent the operator, when removing the cables, from reaching into a region of the cable processing machine that is potentially hazardous to the operator.

For example, the cable storage means can be designed to prevent the operator from reaching into the processing region at all. For this purpose, the cable storage means can be curved or narrowed accordingly. Additionally or alternatively, the removal portion can be closed toward the processing region, for example by a flap or the like that is movable in only one direction. This can prevent the operator from injuring himself when removing the cables, for example by accidentally coming into contact with moving parts of the cable processing machine located in the processing region.

According to one embodiment, the cable processing machine further comprises a protective wall which at least partially surrounds the processing region during operation of the cable processing machine in order to prevent the operator from reaching into the processing region. The protective wall has a first passage and a second passage. The conveying device is designed to convey the batches through the first passage, while the removal portion is formed on the second passage.

For example, the protective wall can close off the processing region all around during the operation of the cable processing machine. In addition, the protective wall can cover the processing region at the top. The protective wall can be removed for maintenance or repair purposes or moved into a position in which the processing region is freely accessible, for example. The first passage and the second passage can be arranged adjacent to one another, for example, such that the operator has access from the same location both to the cables in the cable storage means and to the batches brought out by the conveying device.

According to one embodiment, the cable storage means is designed as a container with a container opening. The container is arranged in the second passage such that it is movable between a receiving position and a removal position. The container opening is accessible from the processing region in the receiving position and from the operating region in the removal position.

In other words, the container opening can be arranged at least partially in the processing region in the receiving position in order to form the receiving portion, and can be arranged at least partially in the operating region in the removal position in order to form the removal portion.

For example, the cable storage means can be designed as a drawer or a compartment that can be tilted about a pivot point. The cable storage means can be open at the top. The container opening can be the only opening in the cable storage means, for example. It is possible that the container opening is located completely in the processing region in the receiving position. In combination with the protective wall which separates the processing region from the operating region, the operator can thus be prevented from reaching into the container opening while cables are being conveyed into the cable storage means.

According to one embodiment, the second passage is closed in the receiving position by a wall surface of the container.

This can prevent the operator from reaching into the processing region through the second passage while the cable storage means is being loaded with cables. For example, the second passage can be closed by a front wall of the cable storage means that faces the operating region. The front wall can have a handle for opening or closing the cable storage means, for example.

According to one embodiment, the second passage is closed in the removal position by a wall surface of the container.

This can prevent the operator from inadvertently reaching into the processing region through the second passage when he removes the cables. For example, the second passage can be closed by a rear wall of the cable storage means that faces the processing region.

According to one embodiment, the cable storage means is fastened to the protective wall.

As a result, the cable storage means can be removed or moved together with the protective wall, provided that it is removable or movable.

According to one embodiment, the receiving portion comprises a chute and the removal portion comprises a storage tray, with the chute opening into the storage tray and the feed device being designed to feed the cables either to the conveying device or to the chute.

A chute can be understood to mean an elongate hollow body or a tubular element. The chute can protrude into the processing region. In order to prevent the operator from reaching into the processing region via the chute, the chute can be angled or curved, for example. In particular, the chute can comprise an upper end and a lower end. The upper end can be arranged in the processing region and can be further away from the storage tray in the vertical direction than the lower end, which can open into the storage tray.

If the processing region is surrounded by a protective wall, as described further above, the storage tray can extend through the second passage on both sides of the protective wall, for example. Alternatively, the storage tray can end at the protective wall. For example, the storage tray can also end on a side of the protective wall that faces the processing region without passing through the second passage. The operator can reach into the storage tray from the operating region through the second passage.

The second passage can be formed, for example, by a correspondingly small opening, which can prevent the operator from reaching into a hazardous region of the cable processing machine when removing the cables from the storage tray.

According to one embodiment, the cable storage means comprises at least two separate cable compartments. Each of the at least two cable compartments has a receiving portion accessible from the processing region for receiving the cables, and a removal portion accessible from the operating region for the operator to safely remove the cables. Accordingly, the feed device is designed to feed the cables either to the conveying device or to one of the receiving portions of the at least two cable compartments.

The cable compartments can be separated from one another in such a way that cables that are fed to different cable compartments do not mix with one another. This allows different types of cables to be provided in a sorted manner. This eliminates the need for time-consuming and error-prone manual sorting.

According to one embodiment, the cable processing machine further comprises a machine table. The cable storage means is fastened to the machine table.

As a result, the cable storage means can be loaded with cables even when the protective wall has been removed, for example during a special operation of the cable processing machine.

According to one embodiment, the feed device comprises a first feed device for loading the conveying device with the cables and a second feed device for loading the cable storage means with the cables. The feed device and the second feed device can be controlled independently of one another.

As a result, the cable storage means and the conveying device can be loaded with cables independently of one another, for example in parallel with one another.

According to one embodiment, the cable processing machine further comprises a signal transmitter for providing a signal which indicates whether or not there are cables in the removal portion, and a control unit for controlling the cable processing machine using the signal.

The signal transmitter can for example be a sensor, a button or a switch or a combination of at least two of the examples mentioned. This means that quality assurance workflows can be controlled in a targeted manner. For example, the control unit can interrupt an ongoing production operation of the cable processing machine if it is determined by means of the signal transmitter that the cables in the removal portions were not removed within a specific time window.

According to one embodiment, the signal transmitter comprises a sensor for providing the signal. In addition or as an alternative, the signal transmitter can comprise a button or a switch for providing the signal.

The sensor can be a light-sensitive, pressure-sensitive or touch-sensitive sensor, for example. The button or the switch can be actuated by the operator either directly or indirectly, for example by means of the cable storage means.

According to one embodiment, the switch is coupled to the cable storage means and can be actuated by moving the cable storage means.

For example, the switch can be actuated in that the cable storage means presses on the switch due to its weight force and actuates the switch as soon as the weight force reaches a certain threshold. Alternatively or additionally, the switch can be actuated by corresponding deformation of the cable storage means, for example by slightly bending a side wall or a bottom of the cable storage means.

Embodiments of the invention will be described in the following with reference to the accompanying drawings, although neither the drawings nor the description should be construed as limiting the invention.

DESCRIPTION OF THE DRAWINGS

The above, as well as other advantages of the present invention, will become readily apparent to those skilled in the art from the following detailed description of a preferred embodiment when considered in the light of the accompanying drawings in which.

The drawings are merely schematic and not to scale. Like reference signs designate like or equivalent features in the various figures.

DETAILED DESCRIPTION

Figure 1:
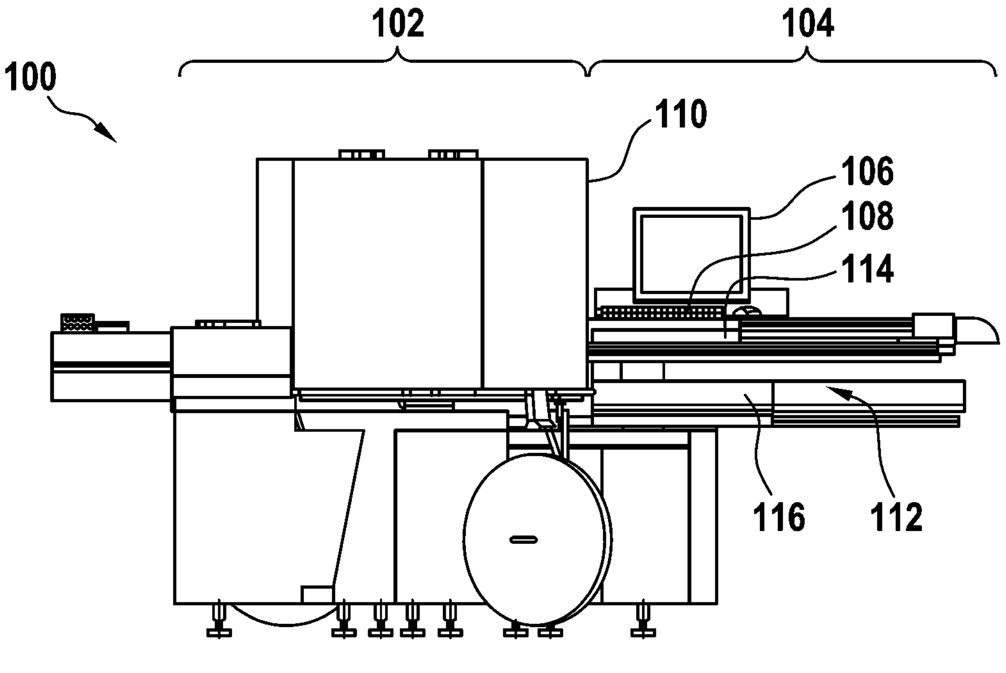
FIG. 1 is a front view of a cable processing machine according to one embodiment of the invention.

FIG. 1 is a front view of a cable processing machine 100 according to one embodiment of the invention. The cable processing machine 100, for example a crimping machine, is divided into a processing region 102 in which cables are processed, and an operating region 104 for operation of the cable processing machine 100 by an operator. From the operating region 104, the operator can remove the cables processed by the cable processing machine 100. In addition, the operator can control the cable processing machine 100 there. For this purpose, the operating region 104 can have a screen 106 and a keyboard 108, for example. In order to prevent the operator from coming into contact with moving parts in the processing region 102, the processing region 102 can be at least partially surrounded by a protective wall 110. A conveying device 112 transports the cables processed in the processing region 102 in batches from the processing region 102 to the operating region 104, where they can be removed by the operator.

By way of example, the conveying device 112 here comprises an upper batch tray 114 and a lower batch tray 116. The cables are first placed in the upper batch tray 114, for example by means of a cable gripper, and from there tipped into the lower batch tray 116, from which they are finally removed by the operator. The advantage of this arrangement is that the cable processing machine 100 can fill the upper batch tray 114 in a production operation, while the operator can simultaneously remove the cables from the lower batch tray 116. This allows almost uninterrupted production of a plurality of batches one after the other.

For safety reasons, the upper batch tray 114 is located within the processing region 102 in the production operation and is therefore not accessible to the operator due to the protective wall 110 (in FIG. 1, the upper batch tray 114 is shown outside the processing region 102 simply for better visibility). As soon as the upper batch tray 114 is filled with a batch, the batch is tipped into the lower batch tray 116 located below, which is then moved from the processing region 102 to the operating region 104, where it is emptied by the operator.

Figure 2:
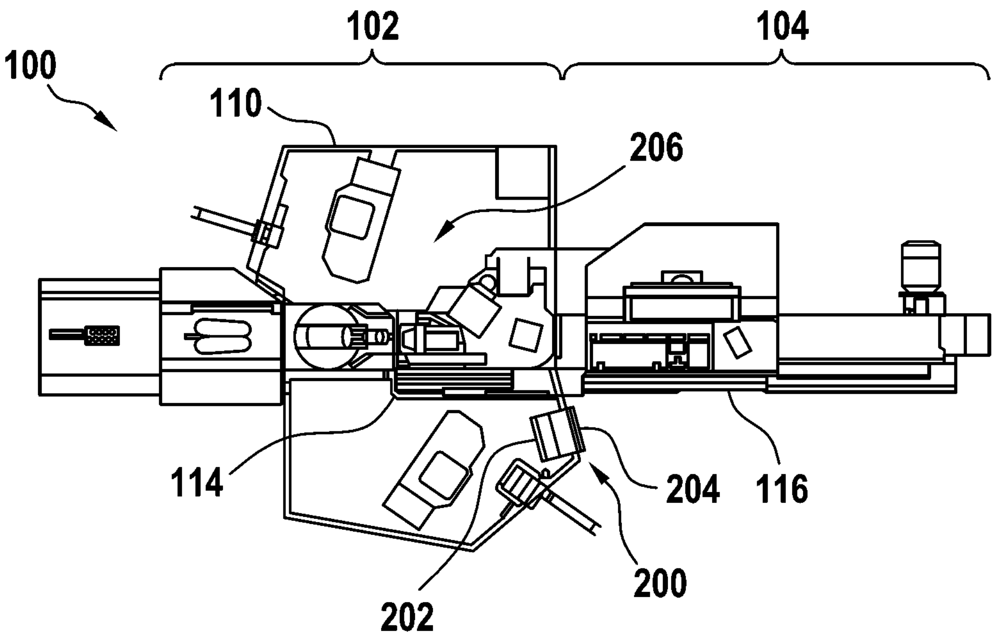
FIG. 2 is a top plan view of the cable processing machine from FIG. 1.

FIG. 2 is a plan view of the cable processing machine 100 from FIG. 1, in which a cable storage means 200 can be seen. The cable storage means 200 is used to store cables in the operating region 104 separately from the lower batch tray 116. The cable storage means 200 comprises a receiving portion 202 for receiving the cables and a removal portion 204 for removing the cables from the cable storage means 200. The receiving portion 202 is located within the processing region 102 surrounded by the protective wall 110. The removal portion 204 is accessible from the operating region 104 and is designed in such a way that the operator can remove the cables without reaching into a region of the cable processing machine 100 that is potentially hazardous to him. The protective wall 110 extends here along an outer edge of a machine table 206 of the cable processing machine 100, for example. The cable storage means 200 can be fastened to the machine table 206 or to the protective wall 110.

Figure 3:
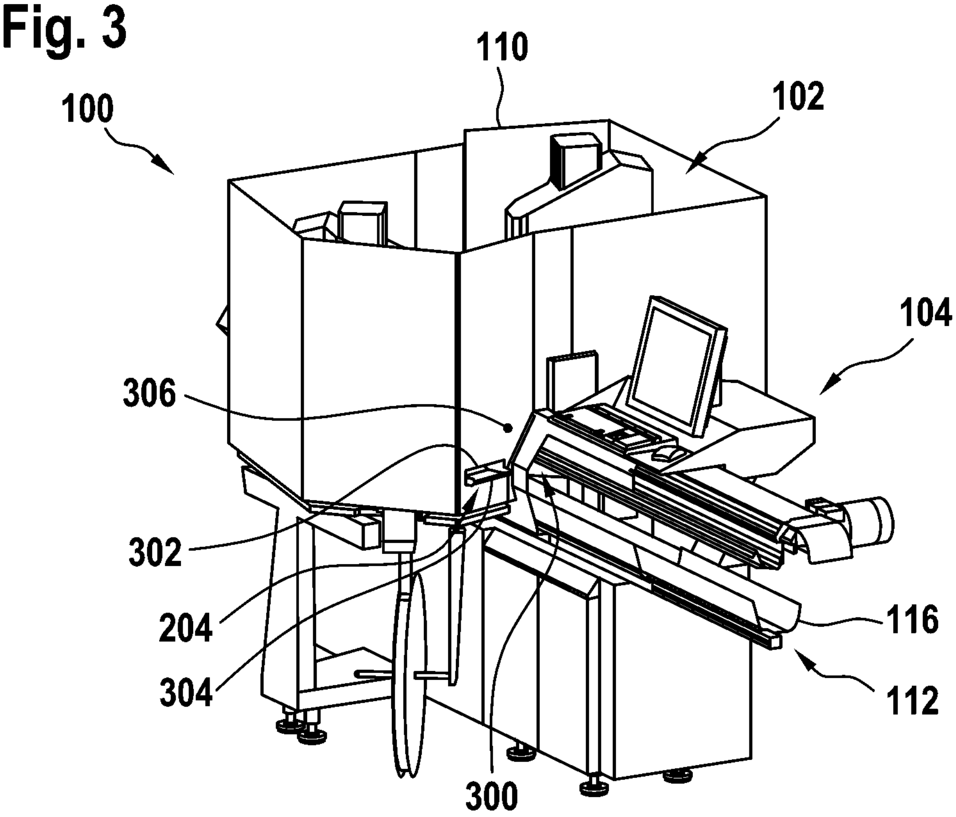
FIG. 3 is a perspective view of the cable processing machine from FIGS. 1 and 2.

FIG. 3 is a perspective view of the cable processing machine 100 from FIGS. 1 and 2. The protective wall 110 has a first passage 300 and a second passage 302. The protective wall 110 is open at the top, for example. The lower batch tray 116 can be moved between the processing region 102 and the operating region 104 through the first passage 300. The second passage 302 is used to remove the cables from the cable storage means 200 via the removal portion 204. The cable storage means 200 can be designed with a storage tray 304, for example. The storage tray 304 can protrude through the second passage 302 into the operating region 104 so that the operator can remove the cables without having to remove the protective wall 110.

The cable processing machine 100 can have an acknowledgment button 306 as a signal transmitter which can be actuated by the operator, for example. By pressing the acknowledgment button 306, the cable processing machine 100 can be informed that the storage tray 304 is empty. The acknowledgment button 306 can expediently be arranged in the vicinity of the second passage 302 on the protective wall 110.

Such monitoring of the removal portion 204 allows for targeted control of quality assurance workflows. For example, it is conceivable for the cable processing machine 100 to interrupt production if the cables, for example a random sample, are not removed from the removal portion 204 within a production cycle that can include a certain number of cables produced one after the other.

Figure 4:
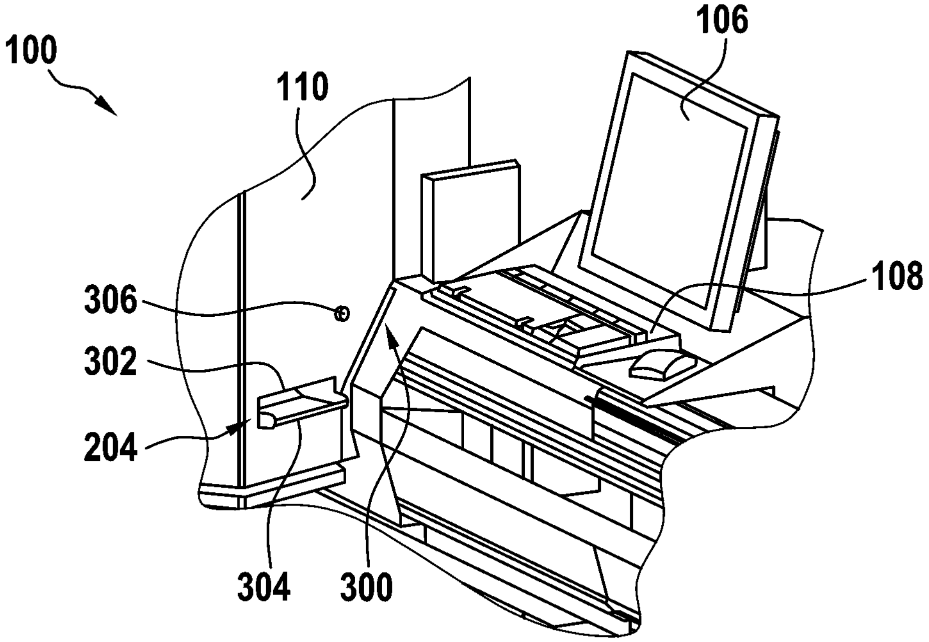
FIG. 4 is a detailed view of the cable processing machine from FIG. 3.

FIG. 4 shows an enlarged portion of the cable processing machine 100 from FIG. 3, in which the removal portion 204 with the storage tray 304 can be seen more clearly.

Figure 5:
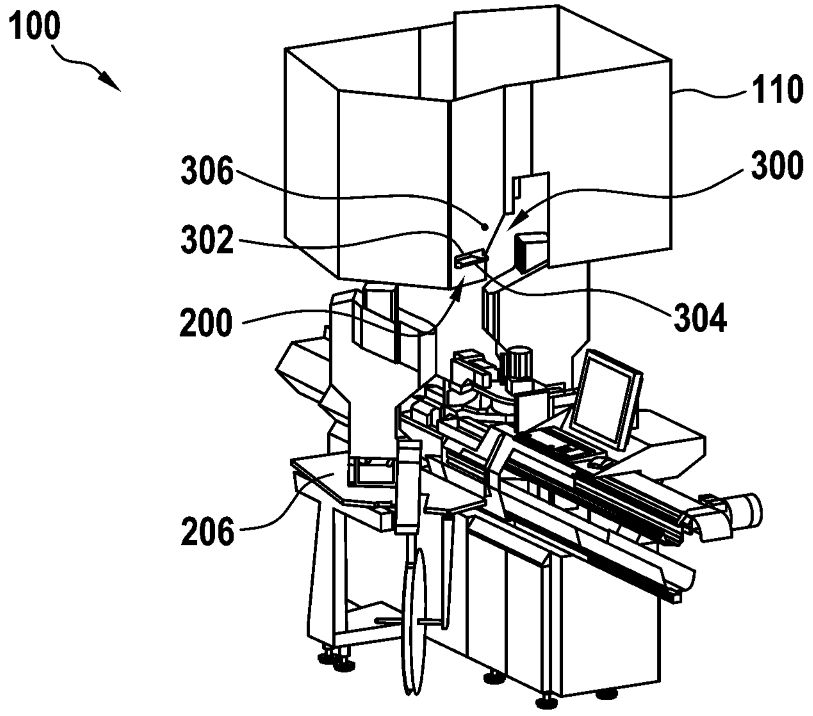
FIG. 5 is a perspective view of the cable processing machine from FIGS. 1 to 4 with the protective wall removed.

FIG. 5 is a perspective view of the cable processing machine 100 from FIGS. 3 and 4 with the protective wall 110 removed. The cable storage means 200 is fastened only to the protective wall 110 here. The cable storage means 200 can thus be removed together with the protective wall 110.

Figure 6:
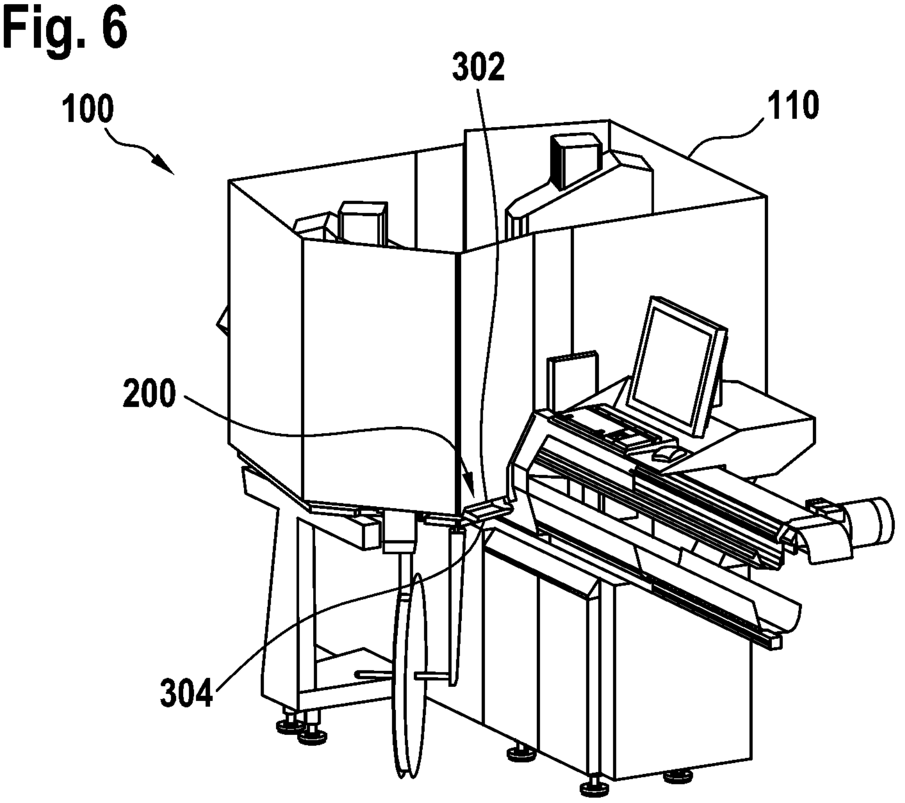
FIG. 6 is a perspective view of the cable processing machine according to a further embodiment of the invention.
Figure 7:
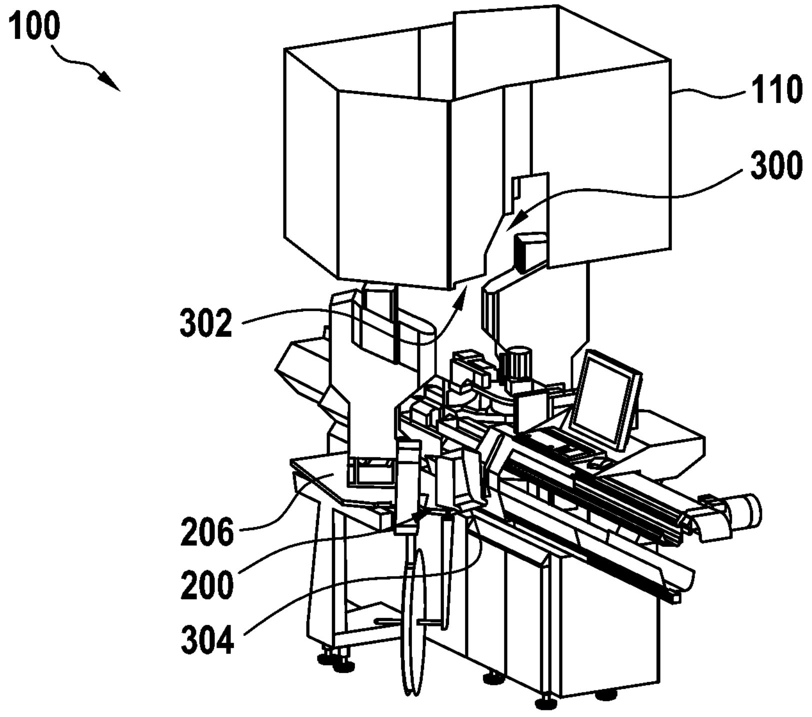
FIG. 7 is a perspective view of the cable processing machine from FIG. 6 with the protective wall removed.

FIG. 6 is a perspective view of a cable processing machine 100 in which, in contrast with FIGS. 3 to 5, the cable storage means 200 is fastened only to the machine table 206 so that the cable storage means 200 remains on the machine table 206 when the protective wall 110 is removed, as shown in FIG. 7, where the protective wall 110 is removed from the machine table 206. As can be seen in FIG. 6, the second passage 302 is not slot-shaped, as shown in FIGS. 3 to 5, but is realized as a recess on the outermost lower edge of the protective wall 110, which recess is adapted to an outer contour of the storage tray 304.

Figure 8:
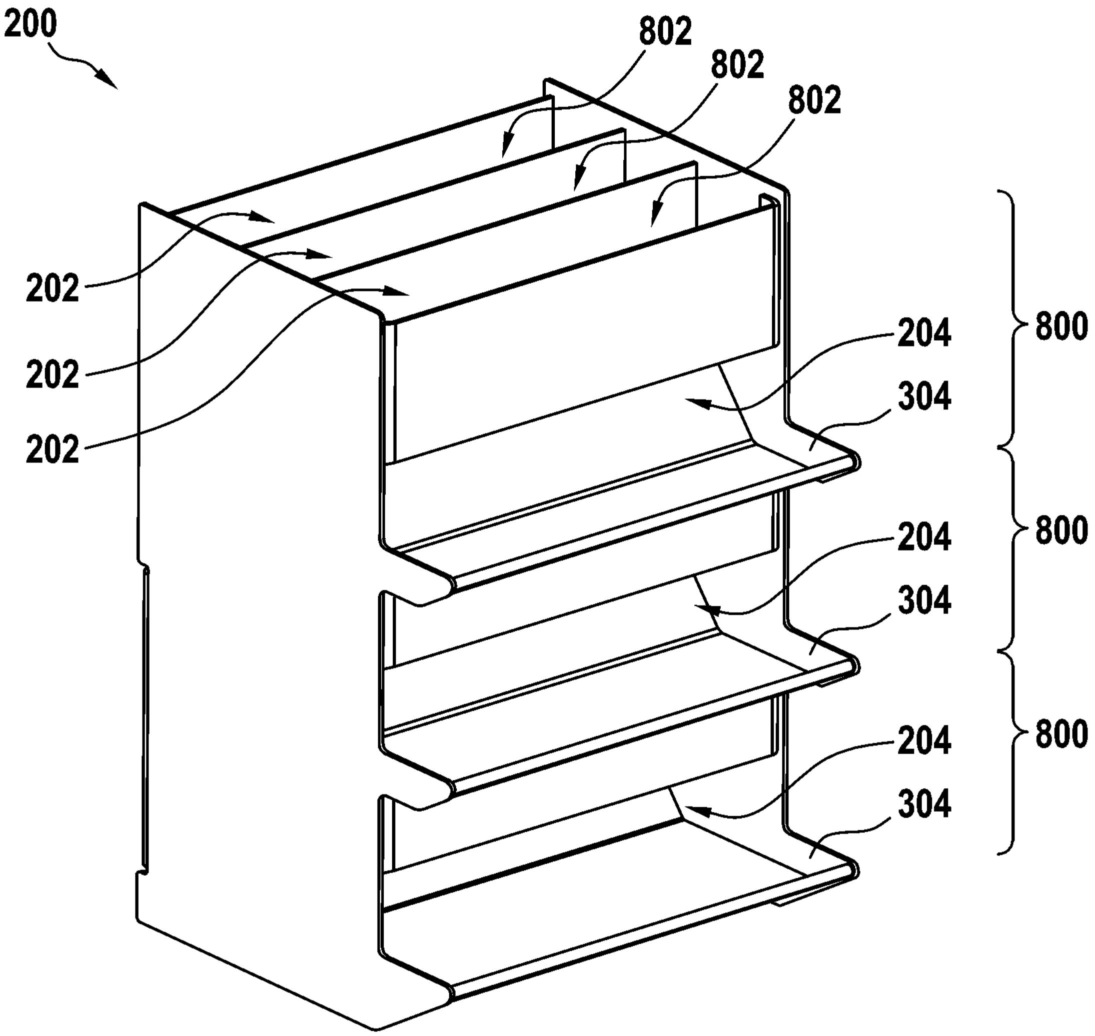
FIG. 8 is a perspective view of a cable storage means with three cable compartments according to one embodiment of the invention.

FIG. 8 is a perspective view of a cable storage means 200 with a plurality of cable compartments 800. For example, the cable storage means 200 is designed here with three separate cable compartments 800 for the separate storage of the cables. Each of the three cable compartments 800 comprises a storage tray 304 and a chute 802 which extends from the processing region 102 to the storage tray 304 when the cable storage means 200 is mounted. The three chutes 802 are each open at the top toward the processing region 102 and open at the bottom into the relevant storage tray 304 which forms the removal portion 204 of the relevant cable compartment 800. An opening of each of the chutes 802 that opens into the processing region 102 can, however, be understood as the receiving portion 202 of the relevant cable compartment 800. If a cable is thrown into one of the three chutes 802, it lands in the corresponding storage tray 304.

The three storage trays 304 are arranged one above the other, i.e. the cable storage means 200 has a three-tier structure. However, it is also possible, alternatively or additionally, for the storage trays 304 to be arranged next to one another.

The cable storage means 200 can have more or also less than three separate cable compartments 800.

For example, a storage location for the cables can be varied by positioning a cable gripper (not shown) over the corresponding chute 802. This makes it possible to store different types of cables in different storage places. For example, the cable processing machine 100 can store faulty cables, cable portions or other cables that are not wanted in the lower batch tray 116 separately from the lower batch tray 116. This prevents the cables from being mixed up.

Figure 9:
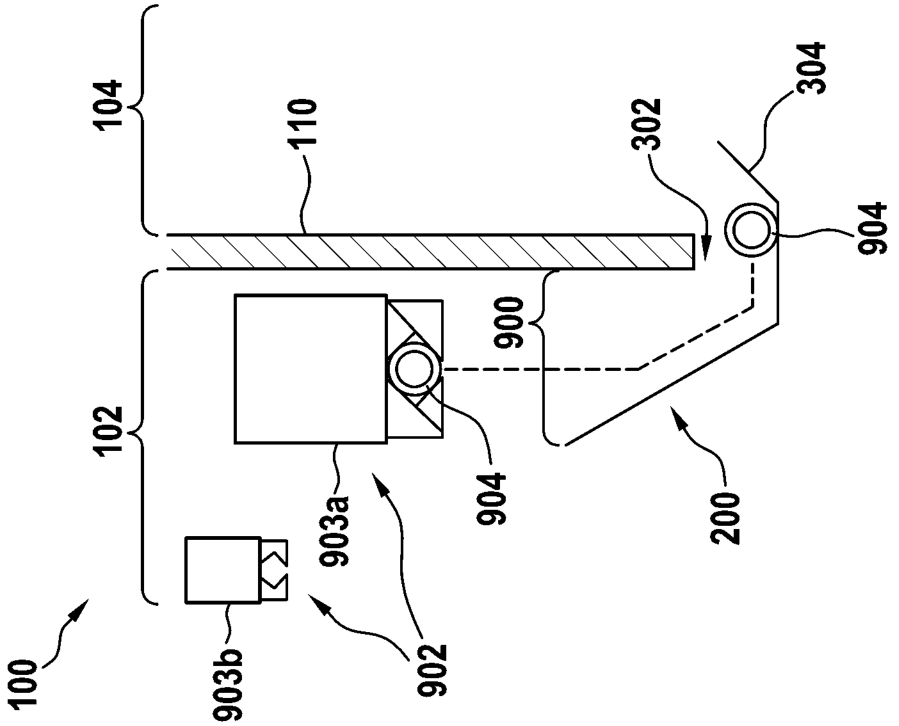
FIG. 9 is a simplified view of a tray-shaped cable storage means according to one embodiment of the invention.

FIG. 9 is a simplified view of a tray-shaped cable storage means 200 which protrudes through the second passage 302 into the processing region 102 on the one hand and into the operating region 104 on the other. A portion of the cable storage means 200 that protrudes into the operating region 104 acts as a storage tray 304. A portion of the cable storage means 200 that protrudes into the processing region 102 forms, together with a portion of the protective wall 110, a type of channel 900.

A feed device 902, which in this case comprises, for example, a cable gripper 903*a* for gripping and moving cables 904 processed by the cable processing machine 100 in the processing region 102, positions a single cable 904 above the channel 900 and lets it fall there, for example. The channel 900 guides the dropped cable 904 into the storage tray 304, as indicated schematically with a dashed line.

The feed device 902 can also be designed to transport the cable 904 into the upper batch tray 114 instead of to the channel 900, for example.

It is possible for the feed device 902 to comprise a further cable gripper 903*b* in addition to the cable gripper 903*a*. The further cable gripper 903*b* can be used, for example, only to transport cables 904 to the conveying device 112, for example into the upper batch tray 114.

Figure 10:
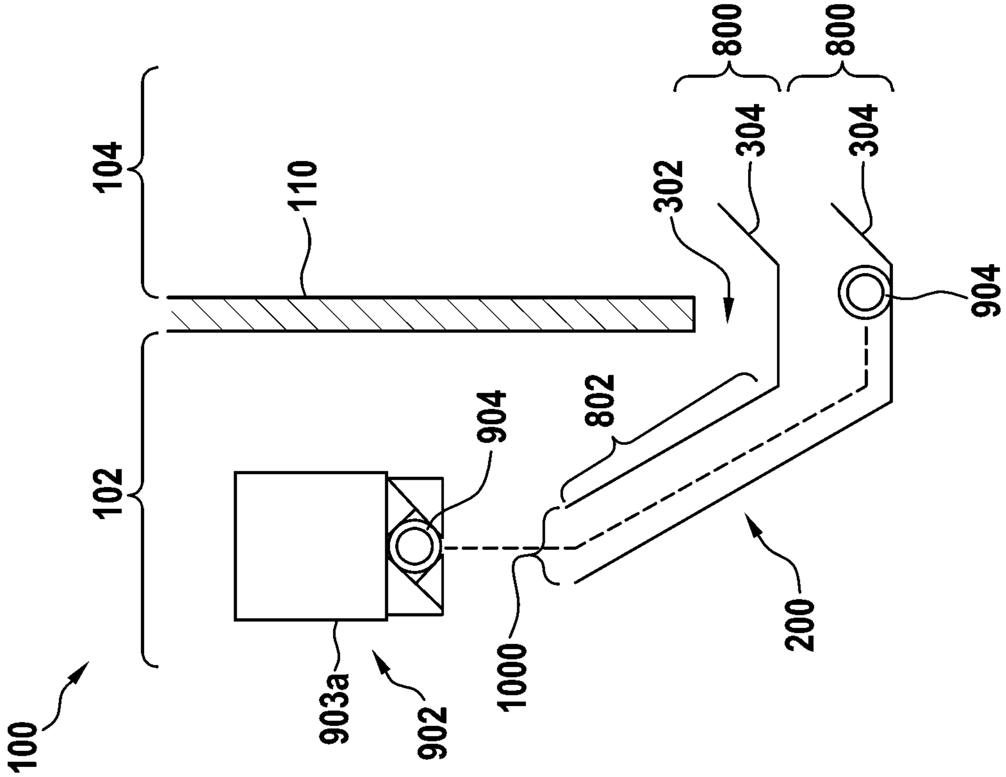
FIG. 10 is a simplified view of a cable storage means with a chute according to one embodiment of the invention.

FIG. 10 shows a cable storage means 200 similar to that from FIG. 9. Instead of the channel 900, the cable storage means 200 in this case has a chute 802 which opens into the processing region 102 and into the storage tray 304. The feed device 902 lets the cable 904 fall into a chute opening 1000 of the chute 802. The chute 802 is shaped such that the operator cannot reach into the processing region 102, or at least cannot reach into it very far, from the operating region 104 with his hand or individual fingers.

In contrast with FIG. 8, the cable storage means 200 is designed here, for example, with two instead of three cable compartments 800, each with a storage tray 304.

Figure 11:
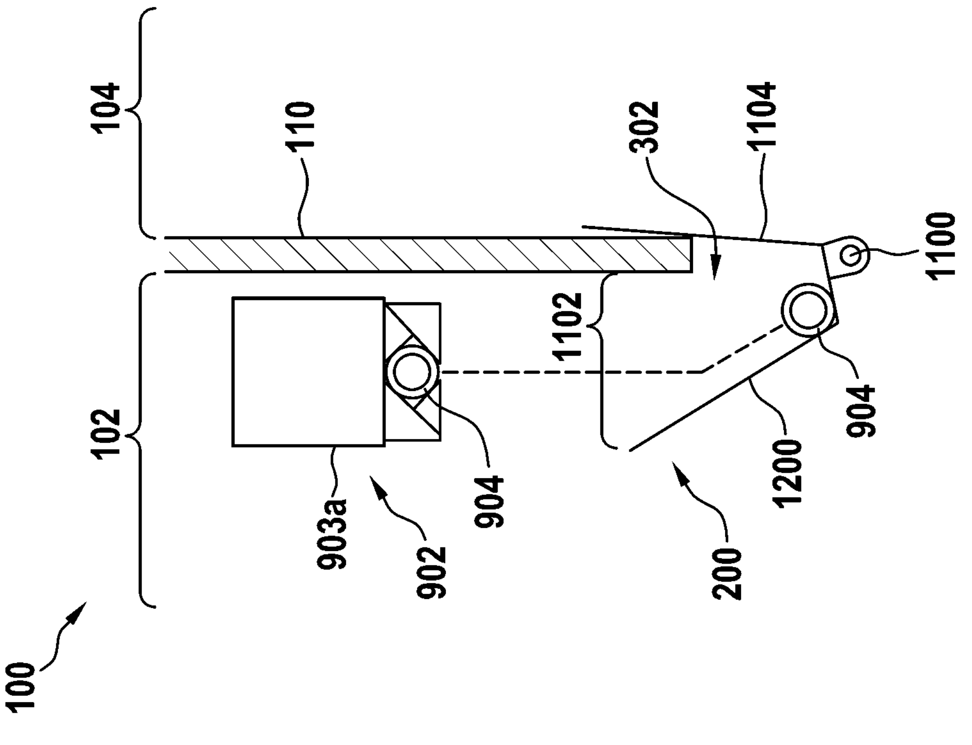
FIG. 11 is a simplified view of a tiltable cable storage means according to one embodiment of the invention in a receiving position.

FIG. 11 is a simplified view of a rocker-like cable storage means 200 which is mounted on a pivot point 1100 so as to be tiltable between a receiving position and a removal position. In other words, the cable storage means 200 is designed here as a container that is open at the top and has a corresponding container opening 1102. The container opening 1102 is the only opening in the container. In the receiving position shown in FIG. 11, the container opening 1102 is arranged in the processing region 102 such that the cable storage means 200 can be filled with one or more cables 904 from above by means of the feed device 902. The second passage 302 is closed by a front wall 1104 of the cable storage means 200 that faces the operating region 104, so that the operator cannot reach into the processing region 102 from the operating region 104.

The pivot point 1100 can be positioned with respect to a center of gravity of the cable storage means 200 in such a way that the cable storage means 200 moves automatically into the receiving position when it is not being held by the operator.

Figure 12:
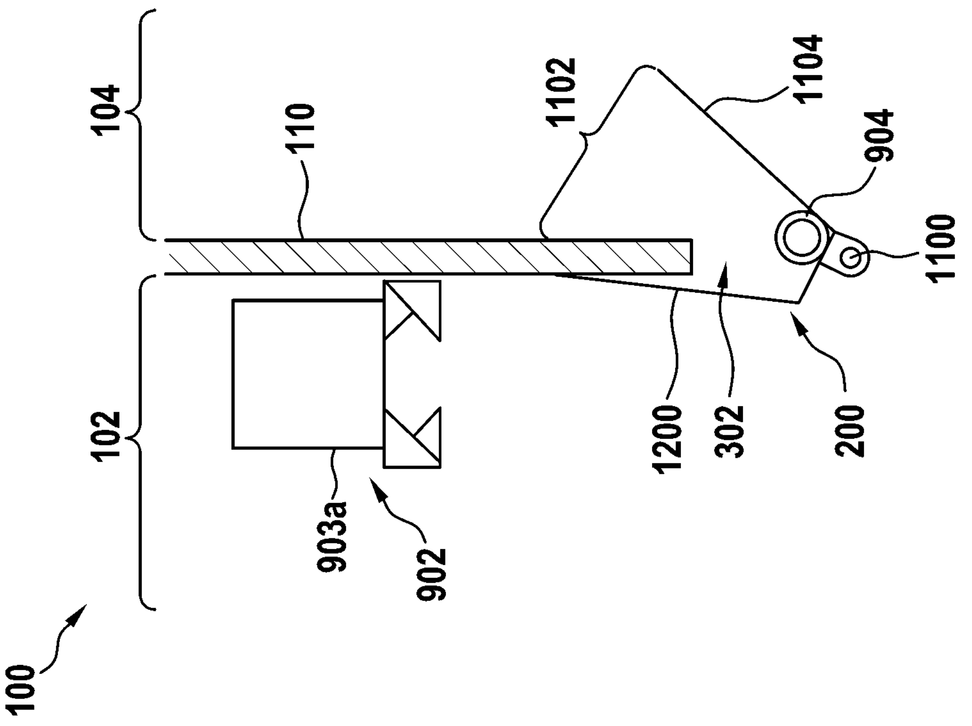
FIG. 12 is a simplified view of the cable storage means from FIG. 11 in a removal position.

FIG. 12 shows the cable storage means 200 from FIG. 11 in the removal position in which the container opening 1102 is located in the operating region 104 so that the cable or cables 904 can be removed by the operator. The second passage 302 is closed by a rear wall 1200 of the cable storage means 200 that faces the processing region 102 so that, in this case too, the operator cannot reach into the processing region 102 from the operating region 104.

Figure 13:
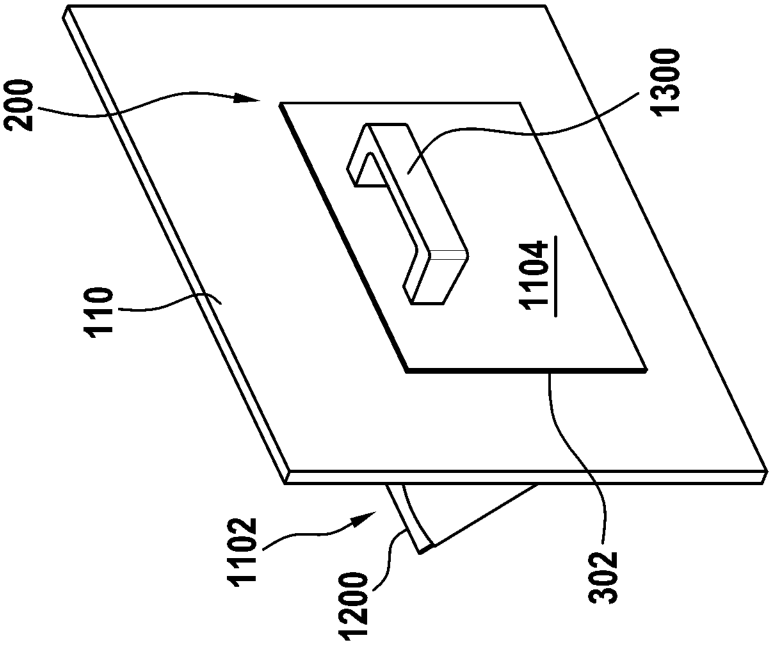
FIG. 13 is a perspective view of the cable storage means from FIGS. 11 and 12 in the receiving position.

FIG. 13 is a perspective view of the cable storage means 200 from FIGS. 11 and 12 in the receiving position. As can be seen here, the cable storage means 200 can have a handle 1300 on the front wall 1104 for moving the cable storage means 200 between the receiving position and the removal position.

Figure 14:
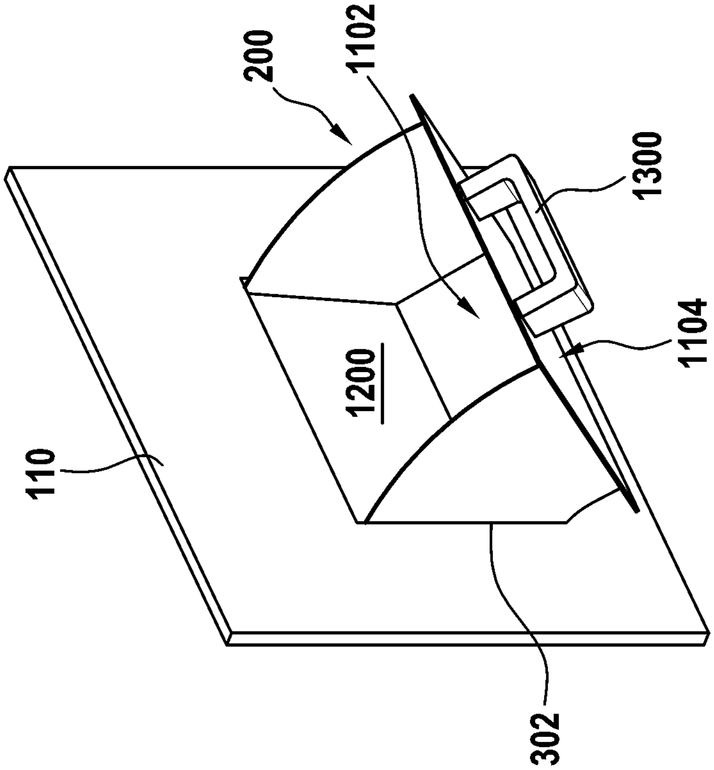
FIG. 14 is a perspective view of the cable storage means from FIGS. 11 to 13 in the removal position.

FIG. 14 is a perspective view of the cable storage means 200 from FIGS. 11 to 13 in the removal position.

Figure 15:
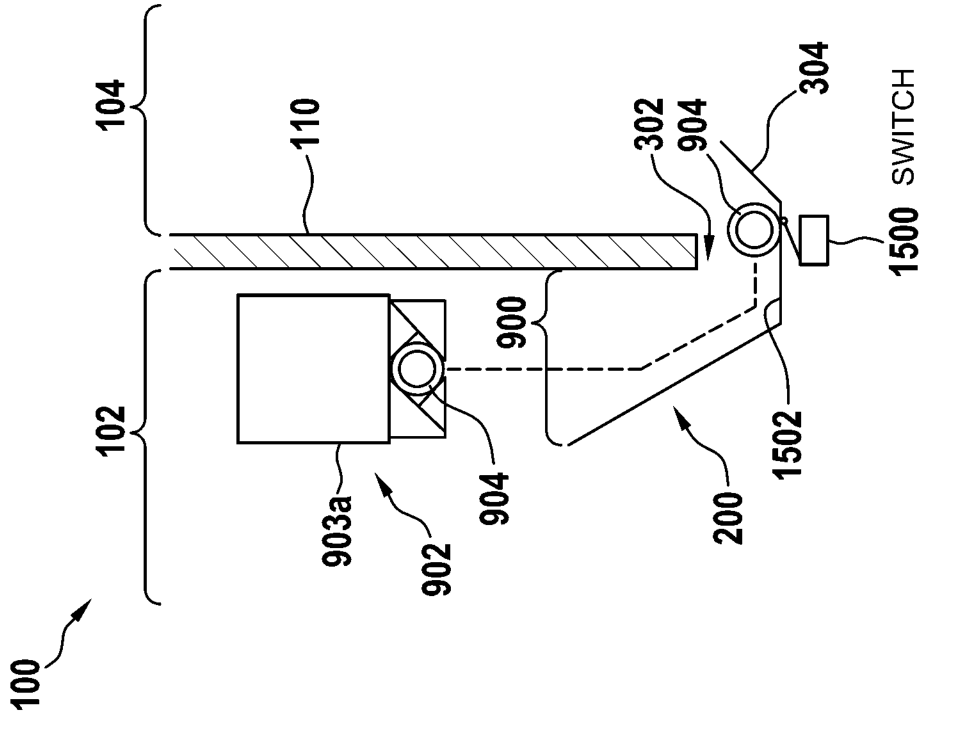
FIG. 15 is a simplified view of a deformable cable storage means with an acknowledgment function according to one embodiment of the invention in a rest position.

FIG. 15 shows a cable storage means 200 with an acknowledgment function. The cable storage means 200 substantially corresponds to the cable storage means shown in FIG. 9, with the difference that the cable storage means 200 is elastically deformable here in the region of the storage tray 304. In addition, the cable storage means 200 is coupled to a signal transmitter in the form of a mechanically actuatable switch 1500, for example a microswitch. The switch 1500 is arranged opposite a bottom 1502 of the cable storage means 200 and can be brought into an actuation position by bending the storage tray 304 accordingly. In FIG. 15, the cable storage means 200 or the switch 1500 coupled thereto is shown in a rest position.

Figure 16:
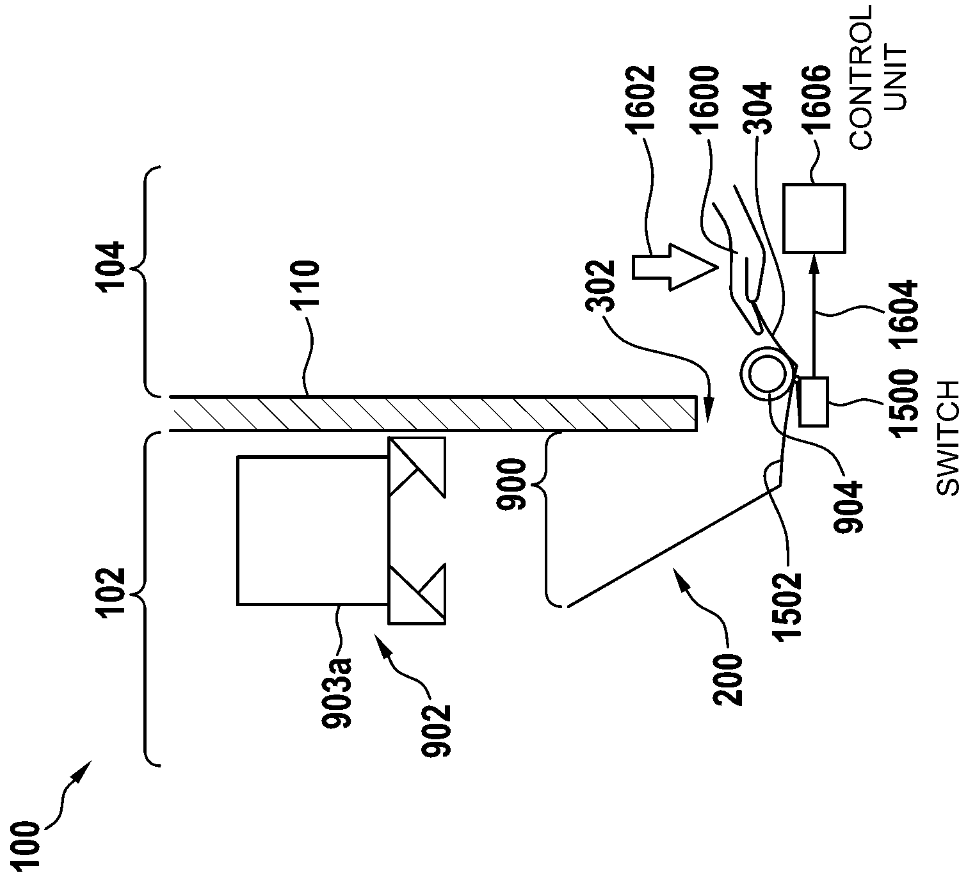
FIG. 16 is a simplified view of the cable storage means from FIG. 15 in an actuation position.

If the operator 1600 presses on the storage tray 304 with his hand, i.e. if the storage tray 304 is subjected to a downward pressure force 1602 and is thereby elastically deformed in the direction of the switch 1500, as shown in FIG. 16, the switch 1500 is brought into the actuation position. The switch 1500 outputs a corresponding signal 1604 which can then be processed in a suitable manner by a control unit 1606 of the cable processing machine 100, for example. The operator 1600 actuates the switch 1500 in this way, for example, when he wants to acknowledge that he has removed all the cables 904 from the storage tray 304.

When the storage tray 304 is released, the storage tray 304 or the switch 1500 coupled thereto returns to the rest position. The cable storage means 200, more precisely the elastically deformable tray 304, thus functions together with the switch 1500 as a type of acknowledgment button, similar to that shown in FIGS. 3 and 4.

As an alternative or in addition to the elastically deformable storage tray 304, the cable storage means 200 can be mounted so as to be movable between the rest position and the actuation position, for example so as to be pivotable on a suitably positioned pivot point 1100 (see FIG. 11). In this case, the cable storage means 200 functions as a kind of lever for operating the switch 1500.

Figure 17:
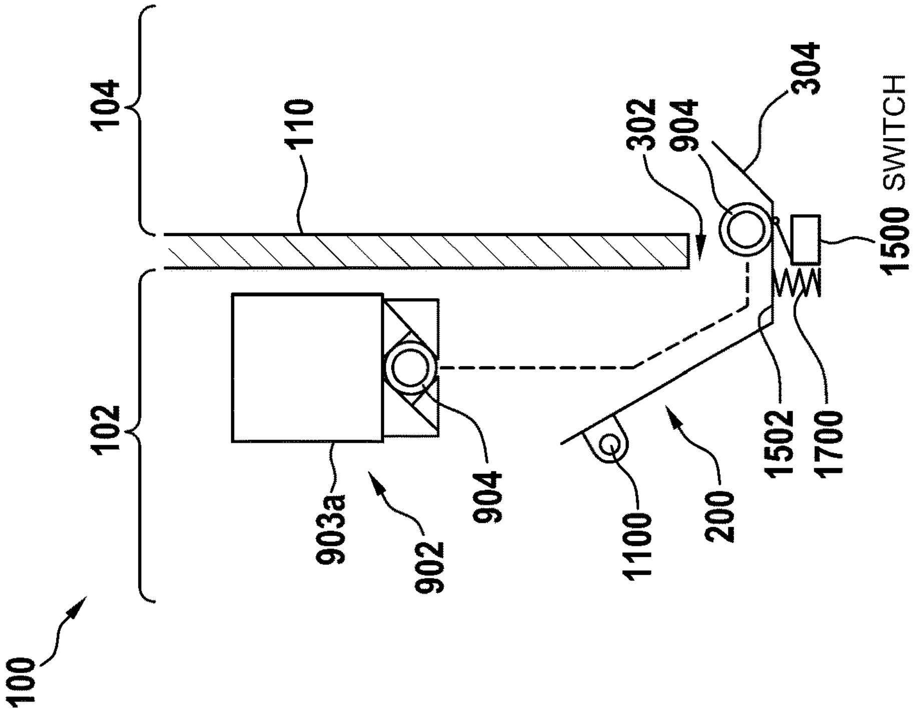
FIG. 17 is a simplified view of a cable storage means in the form of a lever with an acknowledgment function according to one embodiment of the invention in a rest position.

FIG. 17 shows an example of a cable storage means 200 functioning as a lever in the rest position.

Figure 18:
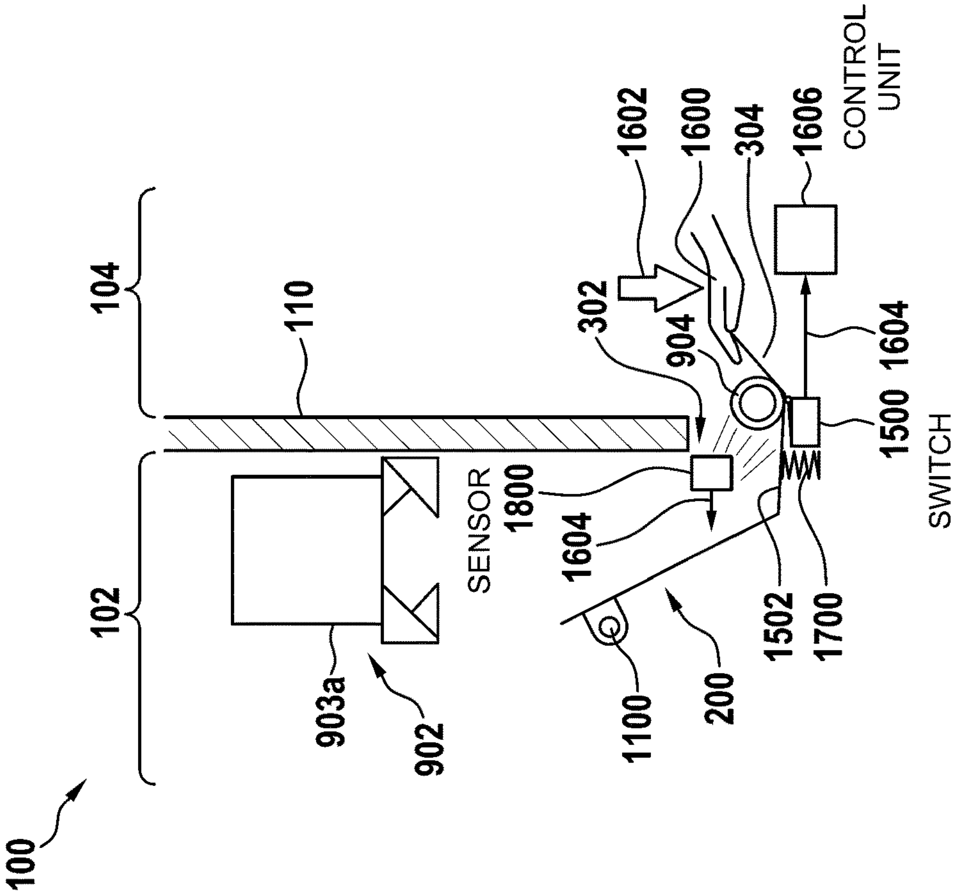
FIG. 18 is a simplified view of the cable storage means from FIG. 17 in an actuation position.

In FIG. 18, the cable storage means 200 from FIG. 17 is shown in the actuation position.

The cable storage means 200 can in this case, similarly to that shown in FIGS. 15 and 16, be brought into the actuation position by applying the pressure force 1602 to the storage tray 304. A restoring element 1700, such as a compression spring, can be used to apply a restoring force to the cable storage means 200 which counteracts the pressure force 1602 and causes the cable storage means 200 or the switch 1500 to return to the rest position when the storage tray 304 is released.

Additionally or alternatively, the cable processing machine 100 can comprise a sensor 1800 as a signal transmitter, which monitors whether or not there are cables 904 in the cable storage means 200, as is shown in FIG. 18. For example, the sensor 1800 can be part of a light barrier and output the signal 1604 when a light beam emitted by a light source of the light barrier is interrupted by one or more cables 904 located in the storage tray 304.

Figure 19:
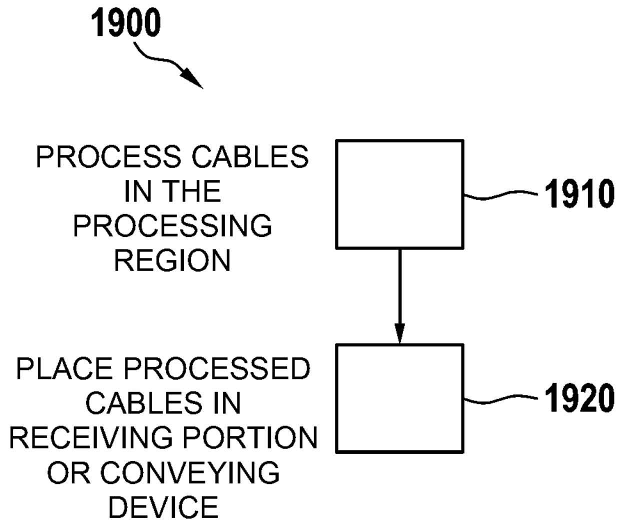
FIG. 19 is a flow chart for a method for operating a cable processing machine according to one embodiment of the invention.

FIG. 19 is an example of a flow chart of a method 1900 for operating the cable processing machine 100 described above. The method 1900 can be carried out, for example, during a normal production operation or also during a special operation, for example with the protective wall removed.

In a first step 1910 of the method 1900, cables are processed in the processing region 102, for example by crimping one or two of their respective cable ends with a plug or the like.

In a second step 1920, the processed cables 904 are then, depending on whether it is a cable from a production batch or a cable to be sorted out from the production batch, such as a random sample, a training or sample cable or scrap, either placed in the receiving portion 202 of the cable storage means 200 by means of the cable gripper 903*a*, or placed in the conveying device 112, for example the upper batch tray 114, by means of the further cable gripper 903*b*.

Finally, it should be noted that terms such as “comprising,” “including,” etc. do not preclude other elements or steps, and terms such as “a” or “an” do not preclude a plurality. Furthermore, it should be noted that features or steps that have been described with reference to one of the above embodiments may also be used in combination with other features or steps of other embodiments described above.

In accordance with the provisions of the patent statutes, the present invention has been described in what is considered to represent its preferred embodiment. However, it should be noted that the invention can be practiced otherwise than as specifically illustrated and described without departing from its spirit or scope.

LIST OF REFERENCE SIGNS

100 cable processing machine
102 processing region
104 operating region
106 screen
108 keyboard
110 protective wall
112 conveying device
114 upper batch tray
116 lower batch tray
200 cable storage means
202 receiving portion
204 removal portion
206 machine table
300 first passage
302 second passage
304 storage tray
306 acknowledgment button
800 cable compartment
802 chute
900 channel
902 feed device
903*a* cable gripper
903*b* further cable gripper
904 cable
1000 chute opening
1100 pivot point
1102 container opening
1104 front wall
1200 rear wall
1300 handle
1500 switch
1502 bottom
1600 operator
1602 pressure force
1604 signal
1606 control unit
1700 restoring element
1800 sensor
1900 method for operating a cable processing machine
1910 step of processing
1920 step of moving

What is claimed is:

1. A cable processing machine for processing cables, the cable processing machine comprising:
- a processing region for processing cables;
- an operating region for operation of the cable processing machine by an operator;
- a conveying device that conveys batches of cables processed in the processing region from the processing region to the operating region;
- a cable storage means having a receiving portion accessible from the processing region for receiving individual cables processed in the processing region, and a removal portion accessible from the operating region for removal of the individual cables from the cable storage means by the operator; and
- a feed device that places each of the cables processed in the processing region either in the conveying device or in the receiving portion.

2. The cable processing machine according to claim 1 wherein the cable storage means is adapted to prevent an operator, when removing the cables from the removal portion, from reaching into a region of the cable processing machine that is potentially hazardous to the operator.

3. The cable processing machine according to claim 1 further comprising:
- a protective wall at least partially surrounding the processing region during operation of the cable processing machine to prevent the operator from reaching into the processing region;
- wherein the protective wall has a first passage and a second passage formed therein;
- wherein the conveying device conveys the batches of cables through the first passage; and
- wherein the removal portion is formed at the second passage.

4. The cable processing machine according to claim 3 wherein the cable storage means is fastened to the protective wall.

5. The cable processing machine according to claim 1 wherein the receiving portion includes a chute and the removal portion includes a storage tray, wherein the chute opens into the storage tray, and wherein the feed device places the individual cables either in the conveying device or in the chute.

6. The cable processing machine according to claim 1 wherein the cable storage means has formed therein at least two separate cable compartments, wherein each of the at least two cable compartments has a receiving portion accessible from the processing region for receiving the individual cables and a removal portion accessible from the operating region for removal of the individual cables by the operator, and wherein the feed device places each of the individual cables either in the conveying device or in one of the receiving portions of the at least two cable compartments.

7. The cable processing machine according to claim 1 further comprising:
- a machine table; and
- wherein the cable storage means is fastened to the machine table.

8. The cable processing machine according to claim 1 wherein the feed device includes a first feed device adapted to load the conveying device with the bundles of cables and a second feed device adapted to load the cable storage means with the individual cables, and wherein the first feed device and the second feed device are controlled independently of one another.

9. A method for operating a cable processing machine according to claim 1, the method comprising the steps of:

processing a cable in the processing region of the cable processing machine; and moving the cable processed in the processing region with the feed device either to the conveying device to form a batch of cables and convey the batch of cables from the processing region to the operating region, or to the receiving portion of the cable storage means to separate the cable from the batch of cables in the operating region.

10. The cable processing machine according to claim 1 wherein the cable storage means is a container having a container opening formed therein, wherein the container is movable between a receiving position and a removal position, and wherein the container opening is accessible from the processing region when in the receiving position and is accessible from the operating region when in the removal position.

11. The cable processing machine according to claim 1 further comprising a control unit controlling the cable processing machine in response to a transmitted signal that indicates whether there are any of the individual cables in the removal portion.

12. A cable processing machine for processing cables, the cable processing machine comprising:

a processing region for processing cables;

an operating region for operation of the cable processing machine by an operator;

a conveying device that conveys batches of cables processed in the processing region from the processing region to the operating region;

a cable storage means having a receiving portion accessible from the processing region for receiving individual cables processed in the processing region, and a removal portion accessible from the operating region for removal of the individual cables from the cable storage means by the operator;

a feed device that places each of the cables processed in the processing region either in the conveying device or in the receiving portion;

a protective wall at least partially surrounding the processing region during operation of the cable processing machine to prevent the operator from reaching into the processing region;

wherein the protective wall has a first passage and a second passage formed therein;

wherein the conveying device conveys the batches of cables through the first passage;

wherein the removal portion is formed at the second passage; and wherein the cable storage means is a container having a container opening formed therein, wherein the container is arranged in the second passage and is movable between a receiving position and a removal position, and wherein the container opening is accessible from the processing region when in the receiving position and is accessible from the operating region when in the removal position.

13. The cable processing machine according to claim 12 wherein the second passage is closed in the receiving position of the container by a wall of the container.

14. The cable processing machine according to claim 12 wherein the second passage is closed in the removal position of the container by a wall of the container.

15. A cable processing machine for processing cables, the cable processing machine comprising:

a processing region for processing cables;

an operating region for operation of the cable processing machine by an operator;

a conveying device that conveys batches of cables processed in the processing region from the processing region to the operating region;

a cable storage means having a receiving portion accessible from the processing region for receiving individual cables processed in the processing region, and a removal portion accessible from the operating region for removal of the individual cables from the cable storage means by the operator;

a feed device that places each of the cables processed in the processing region either in the conveying device or in the receiving portion;

a signal transmitter providing a signal that indicates whether there are any of the individual cables in the removal portion; and a control unit controlling the cable processing machine in response to the signal.

16. The cable processing machine according to claim 15 wherein the signal transmitter includes a sensor providing the signal, and wherein the signal transmitter is at least one of a button that provides the signal when actuated and a switch that provides the signal when actuated.

17. The cable processing machine according to claim 16 wherein the switch is coupled to the cable storage means and is actuated by moving the cable storage means.

* * * * *